Patented Nov. 21, 1950

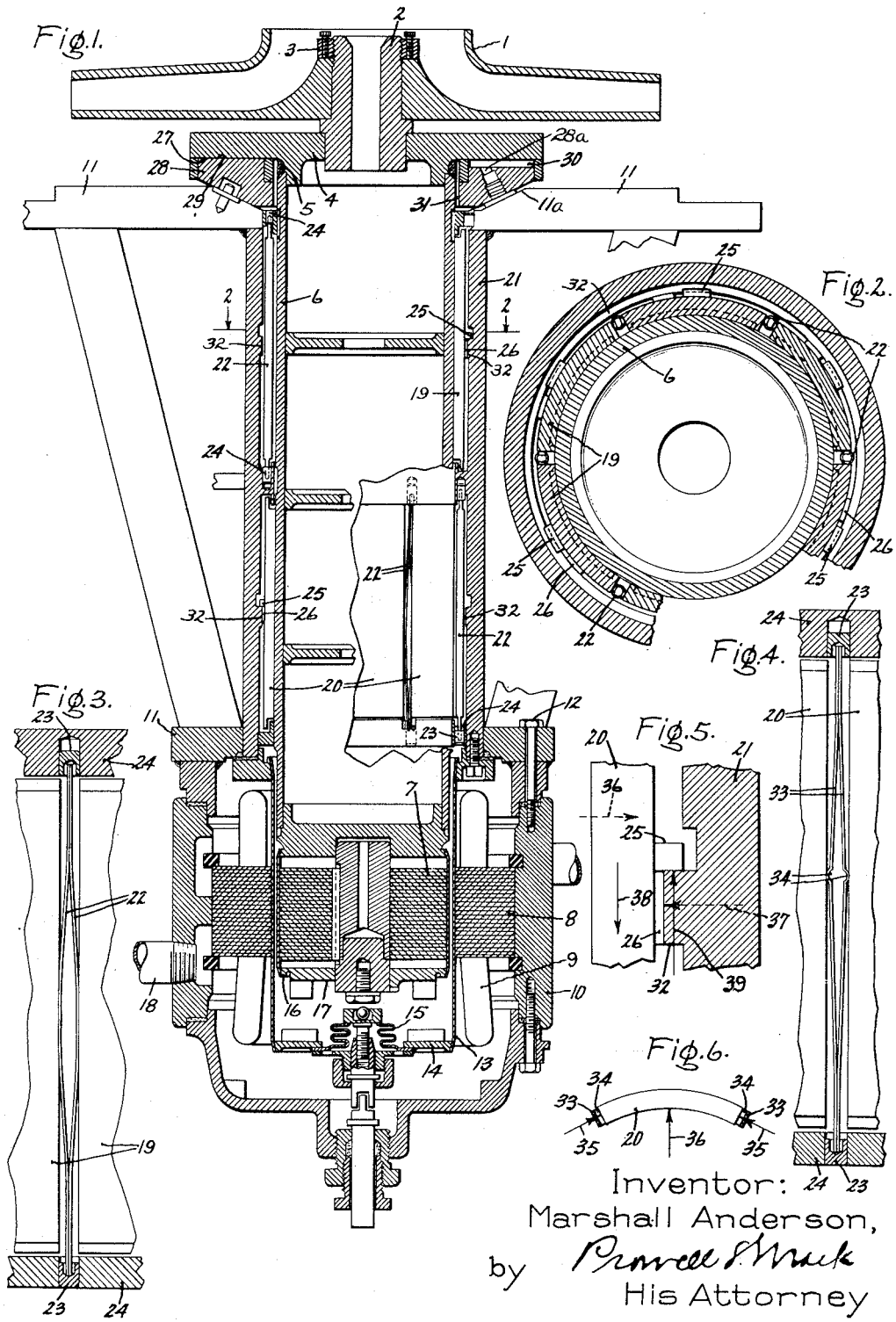

2,531,098

UNITED STATES PATENT OFFICE 2,531,098

DRIVING MECHANISM

Marshall Anderson, Marblehead, Mass., assignor to General Electric Company, a corporation of New York Application December 28, 1945, Serial No. 637,734

11 Claims. (Cl. 230—117)

My invention relates to driving mechanisms and particularly to an arrangement in which a dynamoelectric machine is adapted to drive a fluid impeller by a direct mechanical connection therebetween.

An object of my invention is to provide an improved driving mechanism in which a driven member is mechanically connected directly to a driving member by a shaft which is supported by a plurality of bearing pads and a thrust bearing.

Another object of my invention is to provide an improved driving mechanism in which a dynamoelectric machine provided with a rotatable member is directly connected to a fluid impeller by a shaft having a diameter substantially the same as that of the rotatable member and which is supported axially by a thrust bearing and radially by a plurality of bearing pads utilizing the fluid actuated by the impeller as lubricant for the shaft bearings.

Further objects and advantages of my invention will become apparent and my invention will be better understood from the following description referring to the accompanying drawing, and the features of novelty which characterize my invention will be pointed out with particularity in the claims annexed to and forming part of this specification.

In the drawing, Fig. 1 is an elevational view, partly in section and partly broken away to show the construction of my improved driving mechanism; Fig. 2 is an enlarged sectional view taken along line 2—2 of Fig. 1; Fig. 3 is an enlarged view of the resilient biasing and retaining springs arranged between the bearing pads showing parts of the cooperating bearing housing and spring retaining means; Fig. 4 is an enlarged view of a modification of the spring arrangement shown in Figs. 1 and 3; Fig. 5 is an enlarged side view of a part of a shoe and casing shown in Fig. 4; and Fig. 6 is an end view of a shoe and sections of springs constructed as shown in Fig. 4.

Referring to the drawing, I have shown an embodiment of my improved driving mechanism which includes a driven fluid impeller member 1 which is adapted to actuate a fluid, such as gas, and which is secured on a stub shaft 2 in any suitable manner, as by a retaining ring 3, for operation by a driving member. The stub shaft 2 is secured to a mounting plate 4, which is welded or otherwise suitably secured at 5, to a cylindrical drive shaft 6, which is adapted to be rotated at the desired speed by a rotatable member 7 of a dynamoelectric machine. This rotatable member 7 is preferably in the form of a squirrel cage induction motor rotor which is adapted to cooperate electrodynamically with a stationary member of the dynamoelectric machine provided with a core 8 and a suitable field exciting winding 9 mounted within a stationary member frame 10, all of which is secured to a suitable framework 11 by bolts 12, or other suitable means. In certain applications, the impeller member 1 may be used for compressing or actuating corrosive gases which might adversely affect the properties of the driving mechanism. In such instances, the impeller member and all of its cooperating parts should be made of a material which does not react to the corrosive gas. In most instances, it will be found desirable to isolate the exciting winding 9 of the stationary member of the dynamoelectric machine from the gas which is actuated by the impeller 1. In order to accomplish this, a cylindrical casing 13 of noncorrosive material, such as stainless steel or Monel metal, is arranged around the stationary member and extends through the air gap between the stationary member and the rotatable member 7. This casing 13 is closed at the end thereof opposite the impeller by a suitable closure plate 14 and a bellows 15, also formed of noncorrosive metal, while the rotatable member of the dynamoelectric machine is provided with a casing 16 and closure plate 17 for totally enclosing the core and winding of the rotatable member 7 and protecting it from the corrosive gases. With such a construction, the stationary member of the dynamoelectric machine must be provided with a special cooling arrangement, and a suitable cooling agent, such as oil, is adapted to be circulated around the winding 9 by provision of a supply 18 connected to the stationary member frame 10, which supplies cooling fluid, such as oil, into the housing of the stationary member and circulates this cooling fluid about the core 8 and the winding 9 to remove heat from the machine. Furthermore, in order to minimize damage to the driving mechanism by the corrosive gases, it is desirable that the shaft 6, together with the mounting plate 4 and stub shaft 2, also be made of a noncorrosive material, such as Monel metal or stainless steel, and that the shaft 6 be supported in bearings which do not require a lubricant such as lubricating oil or grease. In order to provide such a supporting arrangement for the shaft 6, this shaft is made of substantially the same diameter as that of the rotatable member 7 of the dynamoelectric machine to provide a relatively large bearing surface and to permit assembly by passage of the rotor through the bearings. The shaft is supported against radial movement (i. e., embraced) by a plurality of axially spaced apart sets of bearing shoes 19 and 20 arranged within a bearing support or housing 21. Each set of bearing shoes comprises circumferentially spaced apart shoes arranged with pairs of bowed leaf springs 22 between adjacent edges of adjacent bearing shoes for resiliently biasing apart these shoes and also for retaining the shoes in the desired position about the shaft 6 and preventing rotation of these shoes with the shaft. This function of the springs 22 is provided by mounting the ends of the springs in small pocket elements 23, which are arranged in mounting rings 24 held solidly in place with respect to frame 11 and housing member 21, and the leaf springs 22 are arranged in staggered relationship for the two sets of bearing shoes for retaining the springs in circumferentially staggered relationship in these two sets of bearings. With this arrangement, a limited amount of clearance is provided between adjacent bearing shoes, and a supporting projection 25 also is formed on the outer side adjacent the middle of each bearing shoe substantially opposite the center of gravity of each shoe for retaining the shoe in position vertically. Another projection 26 is provided adjacent the supporting projection 25 for the purpose of locating the shoe radially and permitting a limited amount of rocking of the bearing shoes about this point. Projection 25 rests on top of, and projection 26 rests against the inner face of, one of the two circumferential rims or projections 32 formed on the bearing support housing. While projection 25 is located substantially in the center of the shoe, circumferentially as well as vertically, projection 26 is, as shown in Fig. 2, considerably displaced circumferentially away from the center of the shoe. For this reason there is an unequal force couple between the action of the springs at each side of the shoe so that the shoe will rock so as to form a wedge shaped clearance between itself and the rotating shaft 6. With this construction, the fluid (i. e., the corrosive gas) which is actuated by the impeller 1 flows into the spaces around the bearing shoes and between the springs 22 into contact with the shaft 6 and provides a certain amount of lubrication for the bearing surfaces of the shaft 6 on the bearing shoes 19 and 20. It has been found that with the use of a large diameter shaft, there is sufficient circulation of this fluid over the bearing surfaces to provide the desired lubrication thereto without the use of any additional lubricant, such that the gas or fluid need not come in contact with any other lubricating material. In addition to the support provided by the bearing shoes, it is desirable that a thrust bearing be provided to counteract the thrust of the impeller and also to support the vertical load of the driving mechanism when it is used with the axis in a vertical direction, as shown in Fig. 1. This thrust may be supported by a thrust bearing arranged adjacent the driven fluid impeller member by providing a bearing member having a substantially radial surface 27 on the underside of the plate 4, which is arranged in contact with a complementary bearing member 28 having a bearing surface 29 extending substantially radially to the axis of the mechanism. This latter bearing member 28 is secured to the bearing support 21 and framework 11 and is formed with grooves 30 in the bearing surface thereof for supplying fluid to the surfaces of the thrust bearing for lubricating the thrust bearing surfaces. This may be accomplished in any conventional manner so that the lubricating fluid is forced between the bearing surfaces by relative rotation of the parts. Optionally, the radial slots 30 may be closed at their inner and outer ends by annular rings such as are shown in the drawing at the inner and outer peripheries of part 28. These unnumbered rings are solidly affixed to bearing member 28. In order for the lubricant to gain entry to the slots 30, corresponding slots 11a are provided between the tapered under surface of part 28 and the correspondingly tapered surface of framework 11. Holes 28a are provided in part 28 to interconnect slots 11a and slots 30, holes 28a optionally being threaded to allow for the insertion of a sealing plug in one or more of the holes if it is found that this will improve the operation of the machine. It will be seen from the drawing that slots 11a not only feed slots 30 but are interconnected with the clearance provided between the inner axial bore 31 of bearing member 28 and the end of the shaft 6 to provide for the passage of fluid between these adjacent surfaces. A small clearance is also provided between the outer periphery of shaft 6 and the inner periphery of the spring retaining rings 24, so that the fluid may pass between these members and then be drawn into the bearing surface clearances formed between shaft 6 and the bearing shoes 19 and 20. It should be noted that the introduction of fluid into either the thrust bearing or the radial shoe bearing is caused by relative rotation of opposite surfaces having appropriately shaped clearances. The mechanism drives an impeller which is shown. A housing for the impeller is not shown but it is assumed that a conventional housing is provided attached to framework 11 and otherwise surrounding said impeller with provision being made for the introduction of fluid to the center of the blades and discharge of the fluid at their peripheral tips, with the lubricant feed clearances 11a openly exposed to the discharged gases. In this manner, the entire load forces of the rotating portion of the driving mechanism is supported by bearings of noncorrosive material which are lubricated entirely by the fluid which is actuated by the fluid impeller without the use of any foreign substance as a lubricant. It has been found that the clearances thus provided between the shaft 6 and the general supporting arrangement 11, together with the bearings 28 and 29, provide for admission of sufficient ambient atmosphere (i. e., the gaseous fluid pumped by the impeller) for adequate lubrication of these bearings as well as the vertically extending bearing formed by the shoes 19 and 20 by the entrance of the fluid surrounding the upper open end of the bearing.

In Figs. 4, 5, and 6, I have shown another embodiment of my improved bearing supporting construction in which bearing shoes 20 are circumferentially spaced apart within a supporting housing 21 in the same manner as that shown in Fig. 1, and outwardly extending projections are formed on the outer side of the shoes substantially opposite the center of gravity thereof for supporting these shoes with supporting projections 32 formed on the inner side of the housing arranged in engagement with the shoe supporting projections 25 for vertically supporting these shoes at a point substantially opposite the center of gravity of the shoes. As in the construction shown in Figs. 1 to 3, the shoes also are provided with projections 26 on the outer sides thereof adjacent the supporting projection 25 for locating the shoes radially within the housing, as these projections 26 are adapted to engage the sides of the projection 32 to prevent axially outward movement of the shoes while, at the same time, allowing a slight rocking of the shoes upon the contact of projections 32 and 26. In this construction, vertically extending bowed leaf springs 33 are arranged between adjacent edges of the bearing shoes 20 and each is formed with a curved contact projection 34 adjacent the longitudinal center thereof and slightly above this center, as is more clearly shown in Fig. 4. Each of these projections 34 extends outwardly into engagement with the edges of the shoes for providing a definite contact point with these shoes for biasing apart and retaining the shoes in position within the housing 21. These springs 33 exert a pressure, as shown in Fig. 6, indicated by arrows 35, upon shoe 20 which produces a resultant outward force on the shoe, as indicated by the arrow 36. Since this resultant force 36 is exerted on the shoes 20 slightly above the longitudinal center and, therefore, above the center of gravity of these shoes, a resultant couple is formed by the force 36 and its complementary resisting force, indicated by the arrow 37, which acts as a restoring couple opposed to the couple formed by the weight of the shoe 20 acting through its center of gravity, as indicated by the arrow 38 in Fig. 5, which forms a couple with the vertical supporting force, indicated by the arrow 39, tending to cause the shoe 20 to fall inwardly towards the shaft and away from the supporting housing 21. The design of the spring force 36 is made so that the resultant force couple 36—37 is equal to the weight couple produced by the forces 37 and 38 which, together with the axial position of the contact points provided by the curved projection 34, prevents the imposition of any forces on the shaft 6 due to the weight of the bearing shoes 20 and their support on the housing 21, thereby minimizing the effect of friction between the bearing shoes and the shaft 6 due to the weight of these shoes. Thus, the springs 33 act to retain the shoes resiliently in position against gravitational displacement.

While I have illustrated and described particular embodiments of my invention, modifications thereof will occur to those skilled in the art. I desire it to be understood, therefore, that my invention is not to be limited to the particular arrangements disclosed, and I intend in the appended claims to cover all modifications which do not depart from the spirit and scope of my invention.

What I claim as new and desire to secure by Letters Patent of the United States is:

1. A driving mechanism including a rotatable shaft, a stationary bearing housing for said shaft, a plurality of circumferentially spaced bearing shoes embracing said shaft, springs arranged between adjacent edges of adjacent bearing shoes for biasing apart said shoes, means for securing said springs to said housing to maintain said circumferential spacing of bearing shoes and prevent rotation thereof circumferentially around said shaft, and means including projections interposed between said shoes and said bearing housing for fixing the radial position of said shoes and for facilitating rocking motion of said shoes.

2. A driving mechanism including a rotatable shaft, a stationary bearing housing for said shaft, a plurality of circumferentially spaced bearing shoes embracing said shaft, springs arranged between adjacent edges of adjacent bearing shoes for biasing apart said shoes and for exerting a radially outward force thereon, means interposed between said shoes and said bearing housing for fixing the position of said shoes and for allowing rocking motion of said shoes to facilitate the introduction of lubricant between said shoes and said shaft, and means locking said springs in position with reference to said stationary bearing housing to retain said shoes against rotation circumferentially around said shaft.

3. A driving mechanism including a rotatable driving member, a vertically extending shaft having a diameter at least as large as the diameter of said driving member, a stationary bearing housing for said shaft, a plurality of circumferentially spaced bearing shoes embracing said shaft, means arranged between adjacent edges of adjacent bearing shoes for biasing apart said shoes and for exerting a radially outward force thereon, and means interposed between said shoes and said bearing housing for fixing the vertical position of said shoes and for allowing rocking motion of said shoes about a vertical axis to facilitate the introduction of lubricant between said shoes and said shaft.

4. A driving mechanism including a rotatable driving member, a vertically extending shaft having a diameter at least as large as the diameter of said driving member, a stationary bearing housing for said shaft, a plurality of circumferentially spaced bearing shoes, springs arranged between adjacent edges of adjacent bearing shoes for biasing apart said shoes and for exerting a radially outward force thereon, means interposed between said shoes and said bearing housing for allowing rocking motion of said shoes about a vertical and a horizontal axis to facilitate the introduction of lubricant between said shoes and said shaft, and means providing for the circulation of fluid to the bearing surfaces of said shaft bearing shoes for lubricating the bearing surfaces thereof.

5. A driving mechanism including a rotatable vertically extending shaft, a stationary bearing housing for said shaft, a plurality of circumferentially spaced bearing shoes embracing said shaft, vertically extending bowed leaf springs arranged between adjacent edges of adjacent bearing shoes for biasing apart said shoes and for exerting a radially outward force thereon, and means interposed between said shoes and said bearing housing for fixing the vertical and radial position of said shoes and for allowing rocking motion of said shoes about a vertical and a horizontal axis to facilitate the introduction of lubricant between said shoes and said shaft.

6. A driving mechanism including a rotatable shaft, a stationary bearing housing for said shaft, a plurality of circumferentially spaced bearing shoes embracing said shaft, springs arranged between adjacent edges of adjacent bearing shoes for biasing apart said shoes and for exerting a radially outward force thereon, means for securing said springs to said housing to prevent rotation thereof circumferentially around said shaft, means including projections interposed between said shoes and said bearing housing for fixing the radial position of said shoes and for allowing rocking motion of said shoes, at least one of said projections being so located with respect to each shoe that said shoe will rock on a pivot which is laterally displaced from the center of the shoe.

7. A driving mechanism including a vertically extending rotatable shaft, a stationary bearing housing for said shaft, a plurality of axially spaced sets of circumferentially spaced bearing shoes embracing said shaft, vertically extending bowed leaf springs arranged between adjacent edges of adjacent bearing shoes for biasing apart said shoes, means retaining said springs from rotation circumferentially around said shaft, means interposed between said shoes and said bearing housing for fixing the radial and vertical position of said shoes and for facilitating rocking motion of said shoes, and means providing for circulation of fluid to the bearing surfaces of said shaft bearing shoes for lubricating the bearing surfaces thereon.

8. A driving mechanism including a vertically extending rotatable shaft, a stationary bearing housing for said shaft, a plurality of axially spaced sets of circumferentially spaced bearing shoes embracing said shaft with shoes of one set circumferentially staggered relative to the shoes of another set, means including vertically extending bowed leaf springs arranged between adjacent edges of adjacent bearing shoes for biasing apart said shoes, means including spring mounting rings for retaining said springs from rotation circumferentially around said shaft, and means interposed between said bearing shoes and said bearing housing for fixing the radial and vertical position of said shoes and for facilitating rocking motion of said shoes to provide for the introduction of lubricating fluid between said shoes and said shaft.

9. A driving mechanism including a dynamo-electric machine having a stationary member and a rotatable member, means for hermetically sealing said stationary member apart from said rotatable member, means including a vertically extending hollow shaft for providing a mechanical connection from said rotatable member, said shaft having a diameter at least as large as that of said rotatable member, a stationary bearing housing for said shaft, a plurality of circumferentially spaced bearing shoes embracing said shaft, springs arranged adjacent edges of adjacent bearing shoes for biasing apart said shoes, means for retaining said springs against rotation around said shaft, means interposed between said shoes and said bearing housing to facilitate rocking of said shoes about a vertical and a horizontal axis to facilitate the introduction of ambient atmosphere within said housing as lubrican between said shoes and said shaft.

10. A driving mechanism including a vertically extending rotatable shaft, a stationary bearing housing for said shaft, a plurality of circumferentially spaced bearing shoes embracing said shaft, resilient means including bowed leaf springs arranged between adjacent edges of adjacent bearing shoes and having a curved contact projection in each of said springs adjacent the longitudinal center thereof and slightly above said center extending outwardly into engagement with said shoe edges for biasing apart said shoes and for retaining said shoes against gravitational displacement, means for restraining said springs and consequently said shoes from rotational movement around said shaft, and means interposed between said shoes and said bearing housing and including projections for fixing the vertical and radial position of said shoes and for allowing rocking motion of said shoes to facilitate the introduction of fluid between said shoes and said shaft.

11. A driving mechanism including a dynamo-electric machine having a stationary member and a rotatable member, means for hermetically sealing said stationary member apart from said rotatable member, means for circulating cooling liquid through said stationary member, a driven impeller member, means including a cylindrical shaft of a diameter of at least as large as that of said rotatable member for providing a mechanical connection between said driven impeller member and said rotatable member, a stationary bearing housing for said shaft, a plurality of axially spaced apart sets of circumferentially spaced bearing shoes located within said housing and embracing said shaft, pairs of bowed leaf springs arranged between adjacent edges of adjacent bearing shoes for resiliently biasing apart said shoes and for exerting a radially outward force thereon, means for retaining said springs in position against rotation, means including projections interposed between said shoes and said bearing housing for fixing the position of said shoes and for allowing rocking motion of said shoes with at least one of said projections being so located with respect to each shoe that said shoes will rock on a pivot which is laterally displaced from the center of the shoes, a thrust bearing arranged adjacent said bearing member and including a bearing member having a radial bearing surface secured to said shaft and a complementary bearing member having a radial bearing surface secured to said bearing support, at least one of said members including radial slots, and means providing for the circulation of fluid from said driven impeller member to the bearing surfaces of said thrust bearing and of said shaft bearing shoes for lubricating the bearing surfaces thereof.

MARSHALL ANDERSON.

REFERENCES CITED

The following references are of record in the file of this patent:

UNITED STATES PATENTS

| Number | Name | Date |
| --- | --- | --- |
| 1,066,635 | MacDonald | July 8, 1913 |
| 1,337,742 | Abbott | Apr. 20, 1920 |
| 1,363,315 | Dron | Dec. 28, 1920 |
| 1,367,450 | Barnickol | Feb. 1, 1921 |
| 1,817,160 | Morison | Aug. 4, 1931 |
| 1,906,715 | Penick | May 2, 1933 |
| 1,973,070 | Hess et al. | Sept. 11, 1934 |
| 2,113,335 | Wallgren | Apr. 5, 1938 |
| 2,167,882 | Fast | Aug. 1, 1939 |
| 2,190,246 | Schirmer | Feb. 13, 1940 |
| 2,322,924 | Daiger | June 29, 1943 |

FOREIGN PATENTS

| Number | Country | Date |
| --- | --- | --- |
| 125,466 | France | Jan. 20, 1927 |
| 141,014 | Austria | Mar. 11, 1935 |
| 252,939 | Great Britain | June 10, 1926 |